(12) United States Patent
Powers

(10) Patent No.: US 9,046,973 B2
(45) Date of Patent: Jun. 2, 2015

(54) TOUCH SCREEN SYSTEM

(75) Inventor: Winston J. Powers, Rochester, NY (US)

(73) Assignee: SCRIPTEL CORPORATION, Columbus, OH (US)

( * ) Notice: Subject to any disclaimer, the term of this patent is extended or adjusted under 35 U.S.C. 154(b) by 0 days.

(21) Appl. No.: 13/487,095

(22) Filed: Jun. 1, 2012

(65) Prior Publication Data
US 2012/0306792 A1 Dec. 6, 2012

Related U.S. Application Data

(60) Provisional application No. 61/492,159, filed on Jun. 1, 2011.

(51) Int. Cl.
G06F 3/041 (2006.01)
G06F 3/044 (2006.01)

(52) U.S. Cl.
CPC ...... G06F 3/044 (2013.01); *G06F 2203/04103* (2013.01); *G06F 2203/04112* (2013.01)

(58) Field of Classification Search
USPC .......................................... 345/173, 174, 175
See application file for complete search history.

(56) References Cited

U.S. PATENT DOCUMENTS

| 3,699,439 A | 10/1972 | Turner |
| 4,055,726 A | 10/1977 | Turner et al. |
| 4,456,787 A | 6/1984 | Schlosser et al. |
| 4,523,654 A | 6/1985 | Quayle et al. |
| 4,600,807 A | 7/1986 | Kable |
| 4,649,232 A | 3/1987 | Nakamura et al. |
| 4,650,926 A | 3/1987 | Nakamura et al. |
| 4,665,283 A | 5/1987 | Kable et al. |
| 4,678,869 A | 7/1987 | Kable |
| 4,695,680 A | 9/1987 | Kable |
| 4,707,572 A | 11/1987 | Kable et al. |
| 4,853,493 A | 8/1989 | Schlosser et al. |
| 6,678,869 B2 | 1/2004 | Ohkubo |
| 2007/0195068 A1 | 8/2007 | Kable et al. |
| 2007/0195069 A1 | 8/2007 | Kable et al. |
| 2008/0018612 A1* | 1/2008 | Nakamura et al. ............ 345/173 |
| 2009/0085894 A1* | 4/2009 | Gandhi et al. ................ 345/175 |
| 2010/0117977 A1 | 5/2010 | Yoshino et al. |
| 2011/0032209 A1* | 2/2011 | Kim ............................... 345/174 |

(Continued)

OTHER PUBLICATIONS

International Search Report, Patent Cooperation Treaty (PCT) Application No. PCT/US2012/040609, Aug. 28, 2012.

*Primary Examiner* — Amare Mangistu
*Assistant Examiner* — Jennifer Zubajlo
(74) *Attorney, Agent, or Firm* — James R. Eley; Michael A. Forhan; Eley Law Firm Co., LPA

(57) ABSTRACT

A touch screen system has an electrically non-conductive substrate. At least one electrically conductive pad is disposed upon the substrate, and an electrically non-conductive cover is placed over the pad. The system further includes a controller having a touch switch interface and at least one output, the touch switch interface being electrically coupled to the pad. The controller generates an AC signal, the AC signal being electrically coupled from the controller to the pad through the touch switch interface, thereby generating an electrostatic field proximate the pad. The controller is also configured to detect at the touch switch interface a change in the electrostatic field resulting from an actuating member contacting the cover proximate the pad. The controller provides at the output a signal relating to the change in the electrostatic field.

18 Claims, 11 Drawing Sheets

(56) References Cited

U.S. PATENT DOCUMENTS

2011/0102346 A1 5/2011 Orsley et al.
2011/0122089 A1* 5/2011 Kobayashi et al. ............ 345/174
2011/0148798 A1* 6/2011 Dahl ............................. 345/173
2011/0234526 A1 9/2011 Mi

* cited by examiner

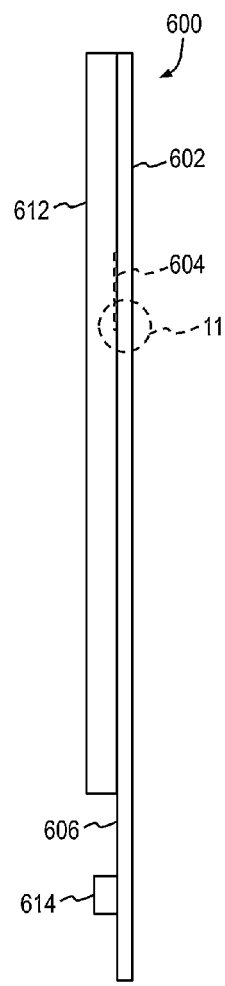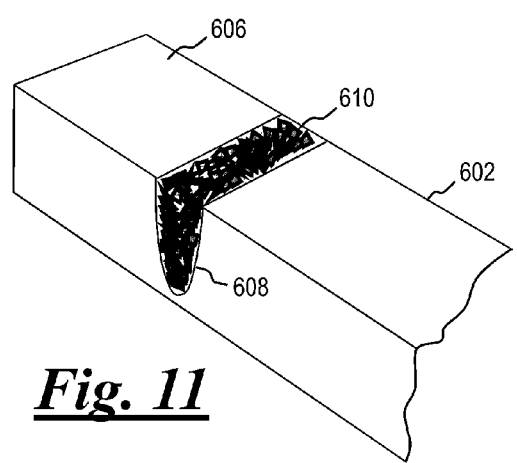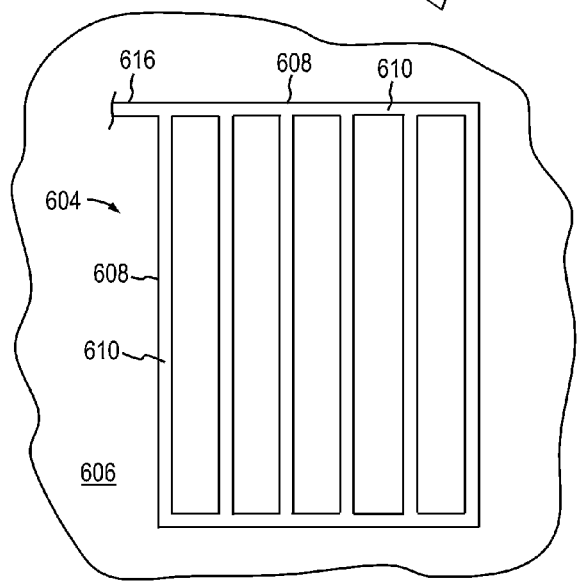
Fig. 9
Fig. 11
Fig. 10

TOUCH SCREEN SYSTEM

This application claims priority to U.S. provisional application 61/492,159, filed Jun. 1, 2011, the contents of which are hereby incorporated by reference.

FIELD

The present invention relates generally to position-determining systems, in particular to a touch screen interface system for determining the position of a surface contact on a visually perceivable display.

BACKGROUND

Touch sensitive screens ("touch screens") are devices that typically mount over a visually perceivable display such as a liquid crystal display (LCD). With a touch screen, a user may select from options visually displayed on the display's viewing surface by touching the surface adjacent to the desired option, or, in some arrangements, touching the option directly. Touch screens allow a user to perform various functions by touching the touch sensor panel using a finger, stylus or other object at a location on the screen being displayed by the display device. Touch screens are commonly found in devices such as tablet computers and smartphones. Touch screens may also be found in many commercial transaction systems, such as automatic teller machines (ATMs), airline ticket and passenger check-in machines, fuel dispensing pumps, and self-serve checkout registers.

Although many advances have been made in the art of touch screen technology, there remain a number of drawbacks. For example, displays with increasingly larger viewing areas are becoming more prevalent. There is a desire to employ a touch screen input technology with these displays. However, the cost to produce a touch screen system is proportional to the size of the display to which the system is installed. Consequently, the cost of the touch screen system can become significant and, in some cases, cost prohibitive.

There is also a desire to produce low-cost touch screen systems for use with handheld and portable devices such as smartphones and tablet computers, as the commercial market for these devices is highly cost-sensitive. Because of the portable nature of these devices, the weight of the touch screen system is also a significant consideration. There remains a need for a lower-cost, light-weight touch screen interface system.

SUMMARY

A touch screen system is disclosed according to several embodiments of the present invention. A first embodiment is a static capacitive touch screen system incorporating chip-on-glass technology. In another embodiment, a dual-sided projective capacitive touch screen system is disclosed. In still other embodiments of the present invention static capacitive touch screen systems with cold-process active and passive components are disclosed. An electro-static touch screen system is disclosed in yet another embodiment of the present invention.

An object of the present invention is a touch screen system. The system has an electrically non-conductive substrate. At least one electrically conductive pad is disposed upon the substrate, and an electrically non-conductive cover is placed over the pad. The system further includes a controller having a touch switch interface and at least one output, the touch switch interface being electrically coupled to the pad. The controller generates an AC signal, the AC signal being electrically coupled from the controller to the pad through the touch switch interface, thereby generating an electrostatic field proximate the pad. The controller is also configured to detect at the touch switch interface a change in the electrostatic field resulting from an actuating member contacting the cover proximate the pad. The controller provides at the output a signal relating to the change in the electrostatic field.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 9 shows the general arrangement of a touch screen system according to yet another embodiment of the present invention;

FIG. 10 is a top plan view of a pad of the touch screen system of FIG. 9;

FIG. 11 is an enlarged partial view of a portion of the pad of FIG. 10;

DETAILED DESCRIPTION

Figure 1:
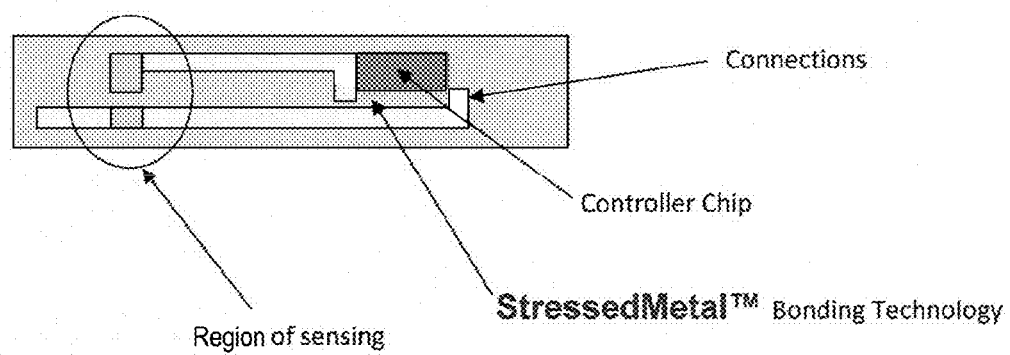
FIG. 1 is a sketch showing chip-on-glass mounting of electronic components to a touch screen display, and STRESSEDMETAL™ springs being used for electrical connection according to an embodiment of the present invention.

The general arrangement of a touch screen system 10 is shown in FIG. 1 according to one embodiment of the present invention.

Figure 2:
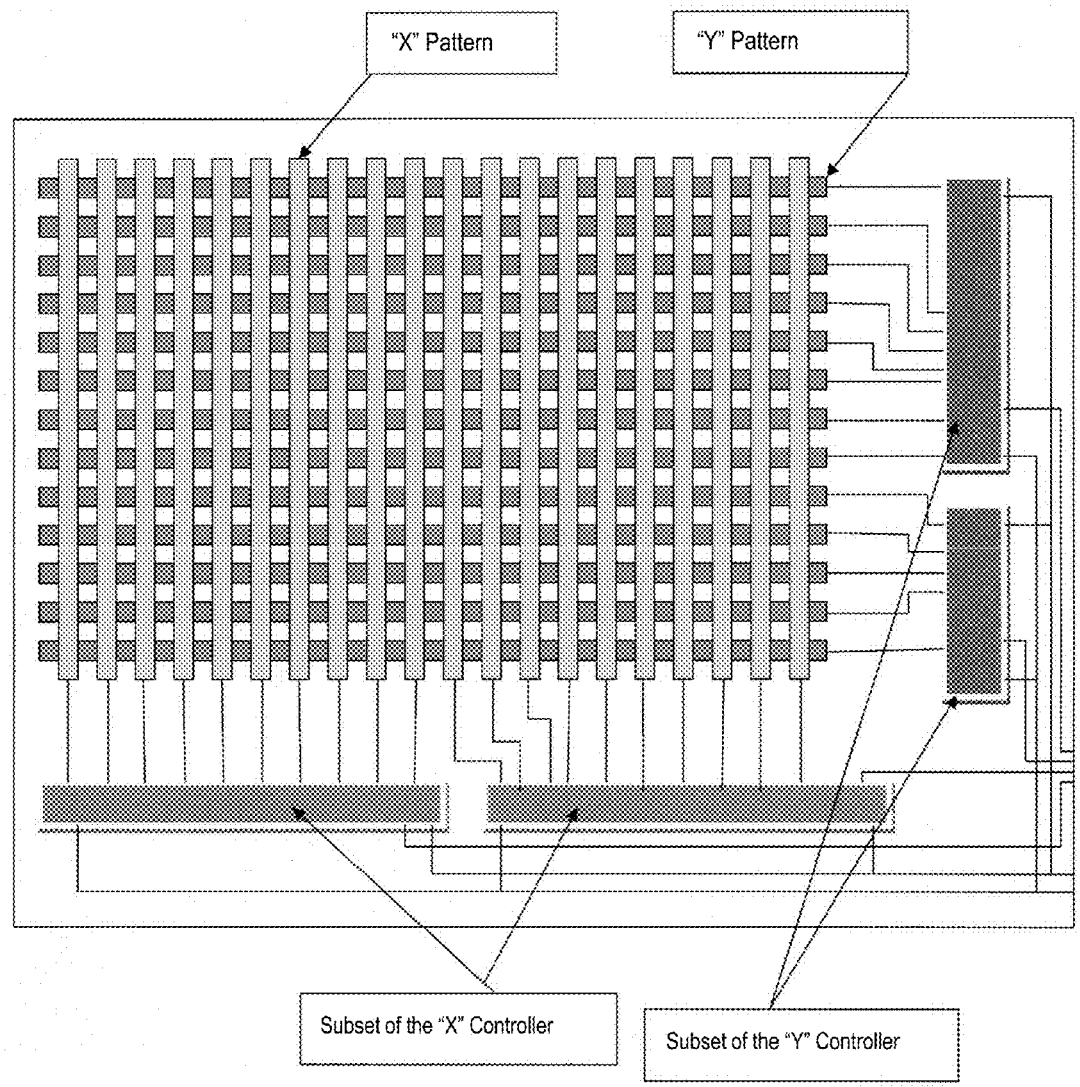
FIG. 2 is a sketch showing components attached to a glass substrate in a chip-on-glass arrangement of the present invention.

With reference to FIGS. 1 and 2, in one embodiment of the present invention a touch screen utilizes a static capacitive system utilizing chip-on-glass (COG) with infra-red radiation (IR) touch detection.

COG is a process wherein electronic components, such as integrated circuits, (ICs) are mounted directly onto a glass substrate. A material such as an anisotropic conductive film (ACF) may be used as a mounting medium to couple bond pads or "bumps" of the electronic components to the substrate. COG provides a compact arrangement of the electronic components as well as low temperature mounting/bonding. COG may also be utilized to increase the number of interfaces in a given surface area of the substrate through the use of fine-pitch connections. COG is cost-effective because it eliminates the requirement for intermediate substrates, packages and connections between the electronic components and the substrate.

An indium tin oxide (ITO) grid and select passive components are disposed upon an underside of a glass sensor panel substrate, while IR photodetector sensors are disposed on a top side of the substrate in a pattern corresponding to their complement mounted to the underside. Electronic circuitry is provided to determine the location of the touch on the panel by detecting the partial and/or full blockage of light received by one or more mapped photodetectors at the location of the touch.

As the human body is also an electrical conductor, touching the surface of the panel results in a distortion of the panel's electrostatic field, measurable as a change in capacitance. Electronic circuitry is provided to determine the location of the touch on the panel by detecting the change in capacitance. An advantage of this system is that it can detect essentially any input including a finger, gloved finger, stylus or pen, which can be a drawback of other technologies.

Connections to control portions may also be made utilizing StressedMetal™ springs available from Palo Alto Research Center (PARC) of Palo Alto, Calif. StressedMetal™ may be used in place of ACF films. The StressedMetal™ springs are micro-machined springs that are utilized as electrical contacts to electrically couple electronic components to the glass substrate. A UV-cured adhesive may be used to mechanically secure the electronic components to the substrate. The relatively small size of StressedMetal™ interconnects allows the formation of high-density interconnects, which provides for a fine pitch.

Integration of Infrared technology and static capacitive technology on one piece of glass permits desirable features such as multi-touch (i.e., the presence of two or more points of contact with the panel) and gesturing (i.e., motion patterns made in contact with the touch screen) with highly-accurate pen input capabilities and palm rejection (i.e., resting a hand or object on the touch screen without activating the touch screen with a false input). Further, utilizing the chip-on-glass teachings herein results in relatively narrow borders of the substrate being unusable for touch-sensing such as, for example, in the range of about ¼-inch to ⅜-inch.

Another embodiment of the present invention comprises a dual-sided projected capacitive (PCAP) touch screen system. In a PCAP system, an X-Y grid is formed on a substrate either by etching a single layer to form a grid pattern of electrodes, or by etching two separate, perpendicular layers of conductive material with parallel lines or tracks to form the grid (comparable to the pixel grid found in many LCD displays).

In this configuration a single piece of glass is provided having ITO grids on both sides. Passive components are mounted to the glass, and a top surface of the glass is "hard coated" using any suitable materials and processes to achieve a wear- and scratch-resistant surface.

The disclosed PCAP touch screen system eliminates one layer of glass to reduce cost, provides higher transmissivity over traditional PCAP for large glass. Using this approach, up to 32-inch or more diagonal displays may be achieved. In addition, tetherless pen, multi-touch and gesturing features may be incorporated.

By placing ITO on each side of the glass in order to create a projected capacitive sensor panel, registration of the pattern is not critical as with the present process of putting ITO on one surface. This becomes apparent to those familiar with the art.

This embodiment only requires a very thin layer of, for example, glass bead coating for protection of the ITO. As a non-limiting example, the coating may be as thin as 5 Microns.

In yet another embodiment of the present invention a touch screen system utilizes static capacitive sensing with IR for active components. A non-ITO electrically conductive grid and active components are disposed upon a glass substrate, as well as IR sensors disposed upon the glass substrate.

Features of this embodiment include integration of infra-red/static sensor panel technology for pen and multi-touch up to 55-inch or more diagonal displays. Narrow borders (such as, for example, in the range of about ¼-inch to ⅜-inch) may be achieved. This embodiment also has high palm rejection in pen mode.

A cold process such as ultra-violet (UV) light curing materials may be utilized to eliminate high heat during production process, which improves yields and thus reduces cost.

Figure 3:
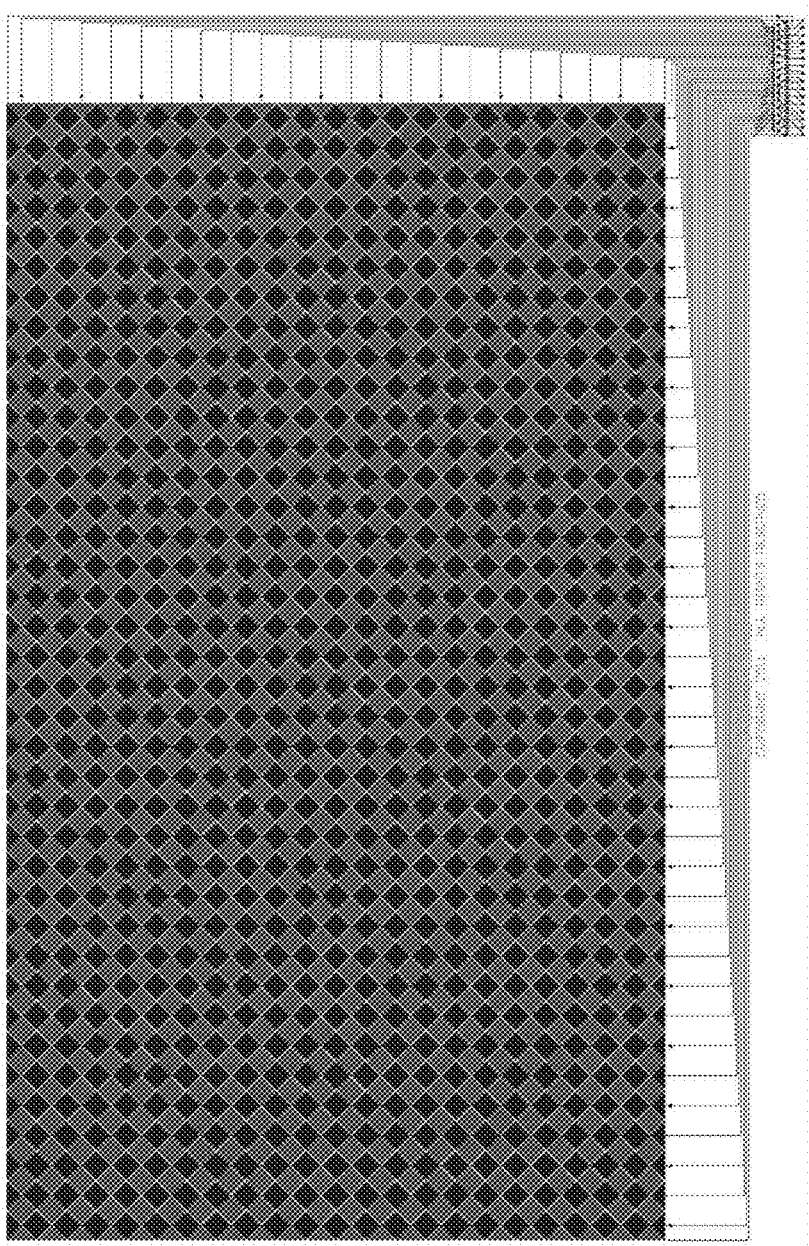
FIG. 3 is a sketch of a dual-sided projected capacitive touch screen according to another embodiment of the present invention.

With reference to FIG. 3, in still another embodiment a touch screen system utilizes static capacitive sensing with IR for passive components. A non-ITO electrically conductive grid with passive components disposed upon a single piece of glass substrate, a hard coat being applied to the substrate for scratch and wear resistance. An application-specific integrated circuit (ASIC) may be provided for controlling the system.

This system features improved transmissivity. In addition, the glass substrate may have a touch screen grid with no borders on two edges and small borders (such as, for example, in the range of about ⅜-inch to ½-inch) on the remaining sides. A glass up to 52-inches or more diagonal may be utilized, with pen and multi-touch features.

A cold process such as UV light-cured materials may be utilized to eliminate high heat during production process, which improves yields and thus reduces cost.

Figure 4:
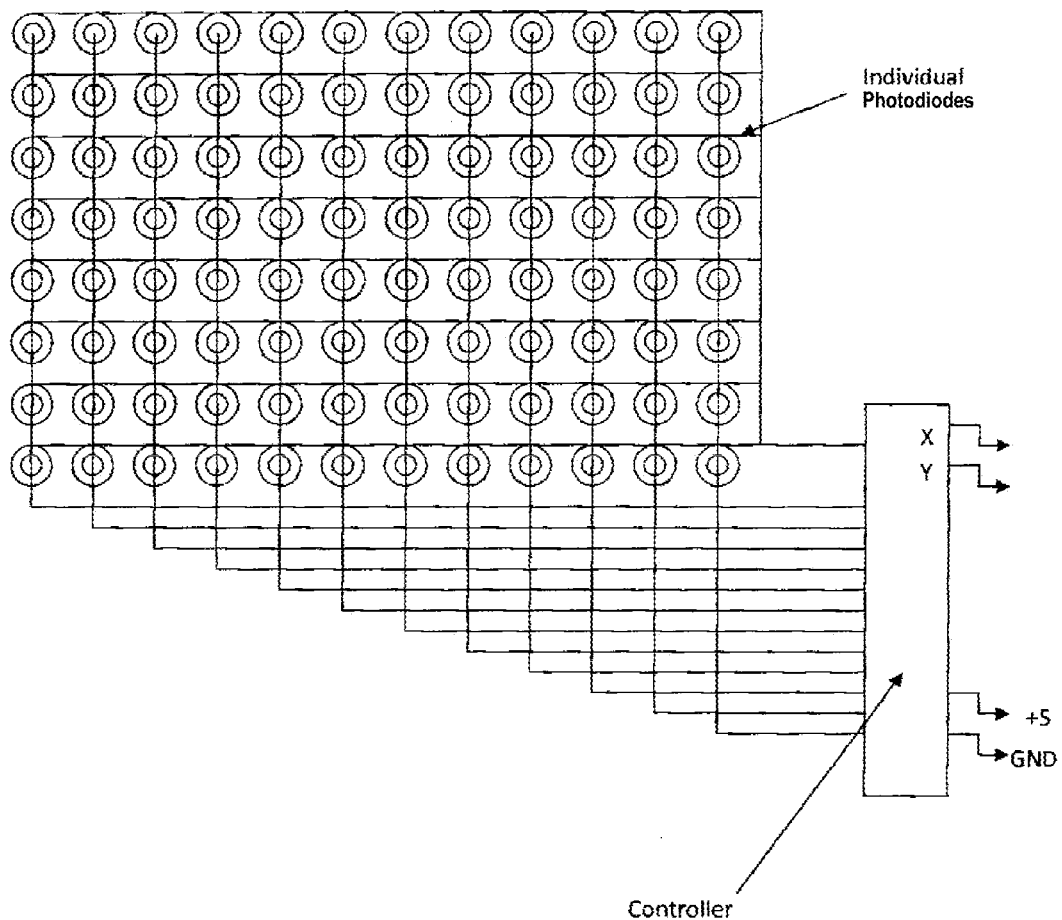
FIG. 4 is a sketch of an electro-static touch screen system according to still another embodiment of the present invention.

With reference to FIG. 4, still another embodiment of the present invention comprises electrostatic (E-CAP) input regions at the pixel level, utilizing photodiodes. In this embodiment crystalline layers are disposed upon a glass substrate to define conductive and non-conductive regions. Electrical connections may be made utilizing StressedMetal™ devices.

This embodiment may be employed to create highly accurate pen and touch panels with high palm rejection in a tetherless pen mode. The present invention may be used with relatively large glass substrates in the range of about 82 or more inches diagonal. This embodiment also provides touch screen systems having low cost. Furthermore, this embodiment may be deployed in high-volume production.

Any suitable electrical connecting means may be utilized for the touch screen system embodiments described above. The following means are provided as illustrative examples and are not intended to be limiting in any way.

Conductive metals may be deposited upon the glass substrate for use in electrical connection. Example materials include, but are not limited to, gold, silver, carbon, and electrically-conductive inks.

A graphene material may also be used for electrical connections in the present invention. Graphene is a flat monolayer of carbon atoms that are tightly packed into a two-dimensional honeycomb lattice, and is a basic building block for graphitic materials of all other dimensionalities. For example, graphene can be rolled into nanotubes. A nanotube is a nanometer-scale tube-like structure. Similarly, graphene material may be used to form nanoneedles. In one embodiment the nanotubes and nanoneedles may be made from carbon.

Similarly, nanotechnology may be applied to conductive materials other than carbon. Examples include, without limitation, transparent conductive oxides, nano-metal particles such as silver, gold and copper, and organic materials such as the polymer PEDOT:PSS.

ITO deposition may be used for electrical interconnection of portions of the disclosed system. ITO provides an electrically conductive surface that has relatively high optical transparency. ITO may be applied to a glass substrate by sputter-coating a thin conductive layer of indium-tin-oxide onto the substrate.

UV-cured materials such as inks, paints, adhesives and epoxies may be used in place of solder to electrically couple various electronic components to the glass substrate of a touch screen system. UV-cured materials may also be used to mechanically join electronic components to the glass substrate.

StressedMetal™ stressed-metal springs with small dimensions and high compliance may be used as an alternative to wire bonds and flip-chip solder bumps. For higher spring conductivity and increased wear resistance, additional spring coatings may be provided. Accordingly, stressed metal springs may be coated with films such as gold, copper and nickel. Such coatings also aid to reduce the effects of mismatches in thermal expansion between different materials. The use of StressedMetal™ connections allows formation of high-density interconnects having a fine pitch, as well as the implementation of COG. As a result, the amount of off-glass interface connections to the touch screen input system can be minimized.

Figure 5:
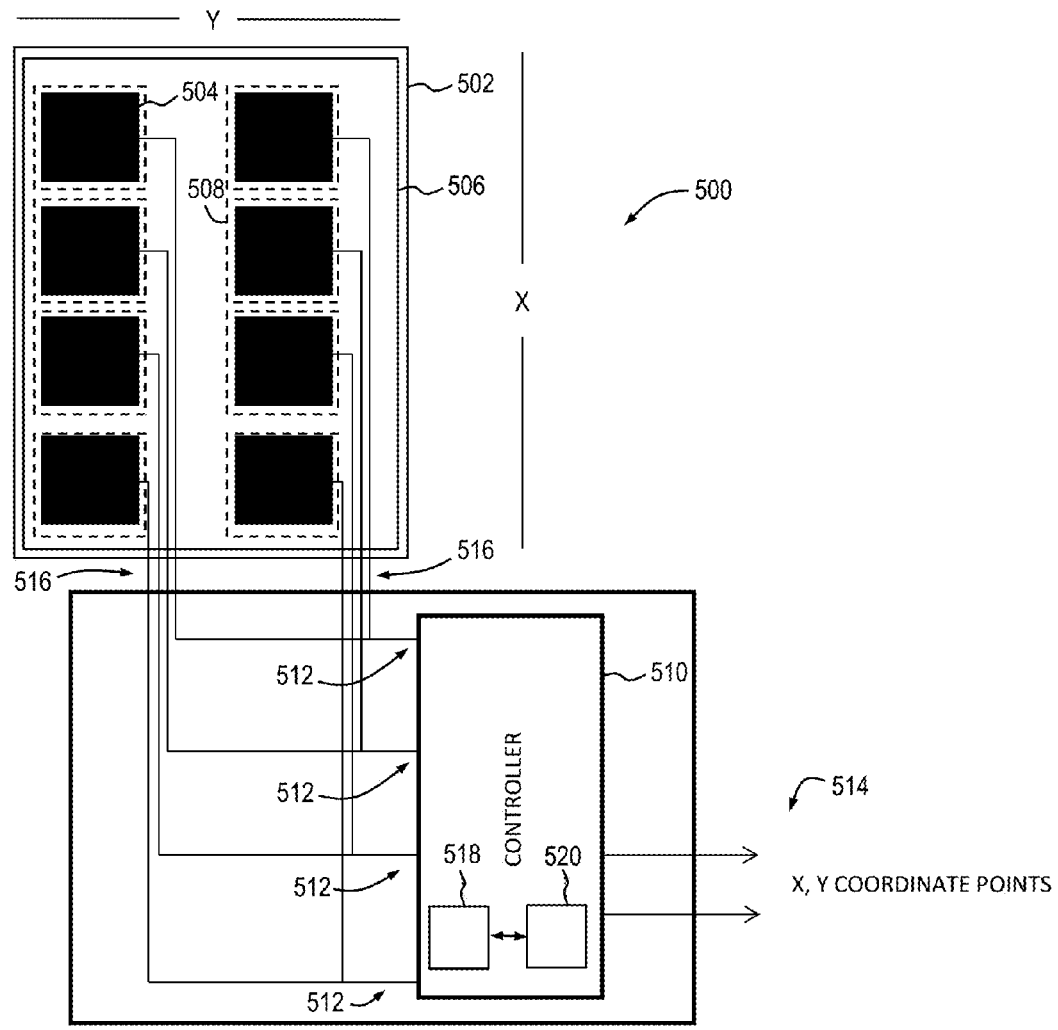
FIG. 5 shows the general arrangement of a touch screen system according to an embodiment of the present invention.

The general arrangement of a touch screen system 500 is shown in FIG. 5 according to an embodiment of the present invention. System 500 includes an electrically non-conductive substrate 502. Substrate 502 may be made from any suitable material, such as a single layer of polyethylene terephthalate (PET). Alternatively, substrate 502 may be made from glass.

Disposed upon substrate 502 are a plurality of electrically conductive pads 504, preferably arranged in a plurality of rows "X" and columns "Y." The conductive material selected for pads 504 include, without limitation, indium tin oxide (ITO), graphene, and nanotechnology or any other non-ITO based electrically conductive material suitable for the purpose of creating a capacitive coupled signal to give a touch or pen location to a host computer (not shown). Preferably, the conductive material selected for conductive pads 504 is generally transparent. Pads 504 may be any desired size or shape. Example shapes include, but are not limited to, square, rectangular, round, triangular, wedge-shaped, and various polygonal shapes.

An electrically non-conductive cover 506 is placed over pads 504 and substrate 502. Cover 506 may be made from any suitable material such as, without limitation, a relatively thin layer of glass. The resulting stack-up of substrate 502, pads 504 and cover 506 is a plurality of capacitive touch switches 508 at each pad.

A controller 510 includes a plurality of touch switch interfaces 512 configured to both supply AC signals to pads 504 and receive changes in an electrostatic field generated at pads 504 by the AC signals. Controller 510 also includes at least one output 514 configured to provide a signal relating to the change in the electrostatic field.

Controller 510 is electrically coupled to pads 504 by a corresponding set of traces 516 extending between touch switch interfaces 512 and the pads. Traces 516 may be made from any material used for pads 504, and may be formed in a manner similar to that utilized to form the pads, such as sputtering.

Controller 510 may further include a memory 518, such as a flash memory, configured to store a predetermined set of instructions, such as a computer program. The computer program may incorporate algorithms. A computer, microcontroller or microprocessor 520 is in electrical communication with memory 518 and executes the instructions stored in the memory in a predetermined manner.

In operation of touch screen system 500, a relatively small AC voltage (such as about 250 kHz) is applied to pads 504 by touch switch interfaces 512 of controller 510 via traces 516, generating a relatively uniform electrostatic field at the pads. When an actuating member, such as a human finger or a probe, touches cover 506 proximate a select touch switch 508, a capacitor is dynamically formed at the select touch switch, the capacitor comprising the pad 504 of the select touch switch and the member as electrodes spaced apart by cover 506, which acts as a dielectric. The dynamically formed capacitor shifts the capacitance of the select touch switch 508, generating a current that alters the amplitude of the AC signal on the pads 504, proximate the pad of the select touch switch 508. A resulting change in the amplitude of the AC signal is detected by controller 510, which generates at output 514 a set of X-Y coordinate points corresponding to the select touch switch 508.

Figure 6:
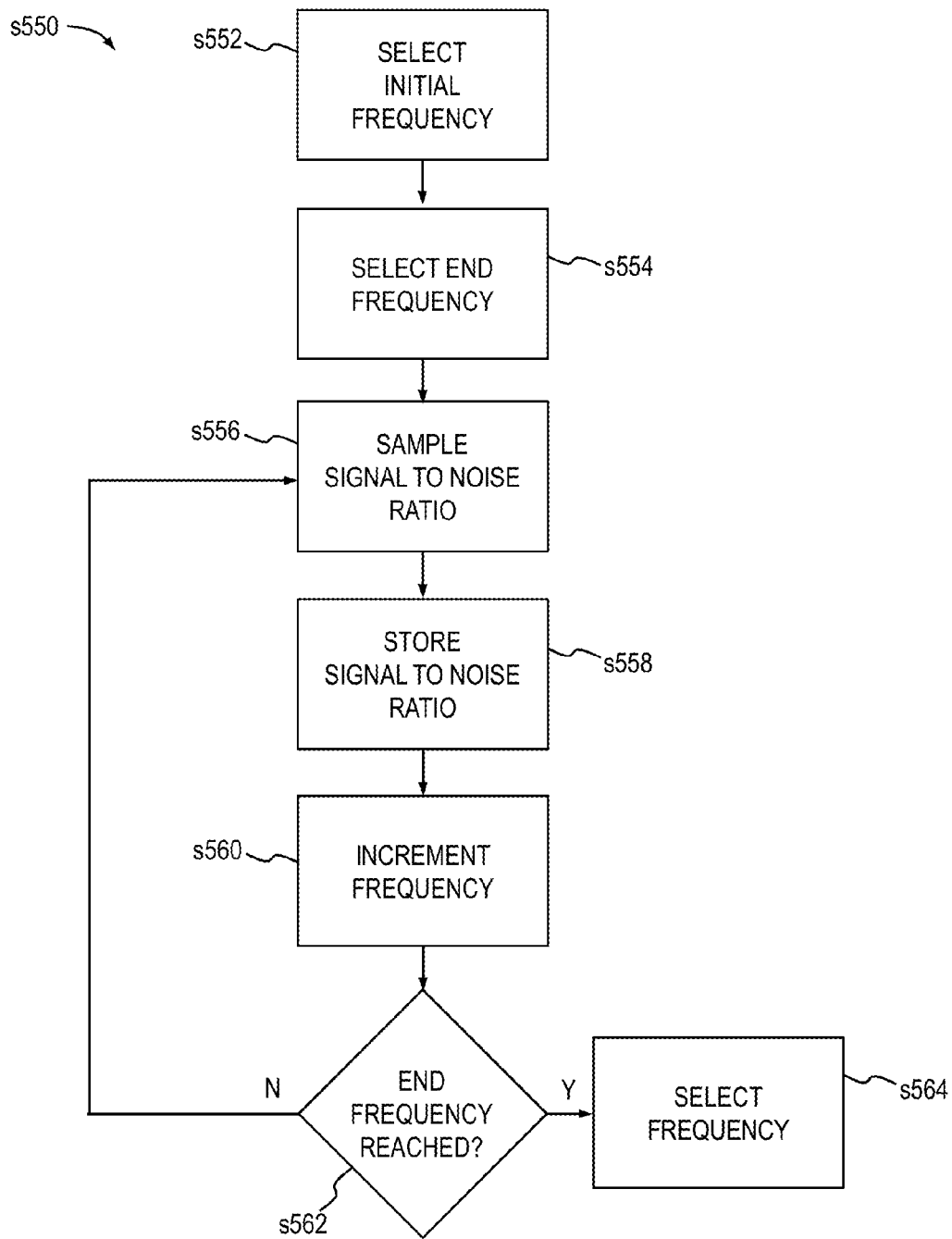
FIG. 6 is a flow diagram of a function incorporated with the touch screen system according to an embodiment of the present invention.

With reference to FIG. 6, in one embodiment of the present invention controller 18 the aforementioned instructions include a function s550 to increase the signal-to-noise ratio of touch screen system 500, the desired signal being the change in amplitude of the aforementioned AC signal. At s552 an initial AC frequency of the voltage applied to pads 504 is selected within a predetermined spectrum such as, for example, about 150 to 250 kHz. At s554 a predetermined end frequency within the spectrum is selected. At s556 the signal-to-noise ratio is measured, and the measurement results (i.e., signal-to-noise ratio and corresponding frequency) are stored at s558.

At s560 the frequency of the AC voltage applied to pads 504 is incremented by a predetermined amount, such as about 5 kHz. A check for the end frequency of s554 is made at s562. If the end frequency has not been reached, steps s556, s558 and s560 are repeated until the end frequency is detected at s562.

Once the end frequency has been detected at s562, the data stored at s558 are reviewed at s564 to find the frequency having the highest signal-to-noise ratio. The frequency having the highest signal-to-noise ratio is selected and controller 510 applies an AC signal with the select frequency to pads 504.

The function of s550 may be repeated periodically to compensate for changing environmental or other conditions at touch screen system 500.

Figure 7:
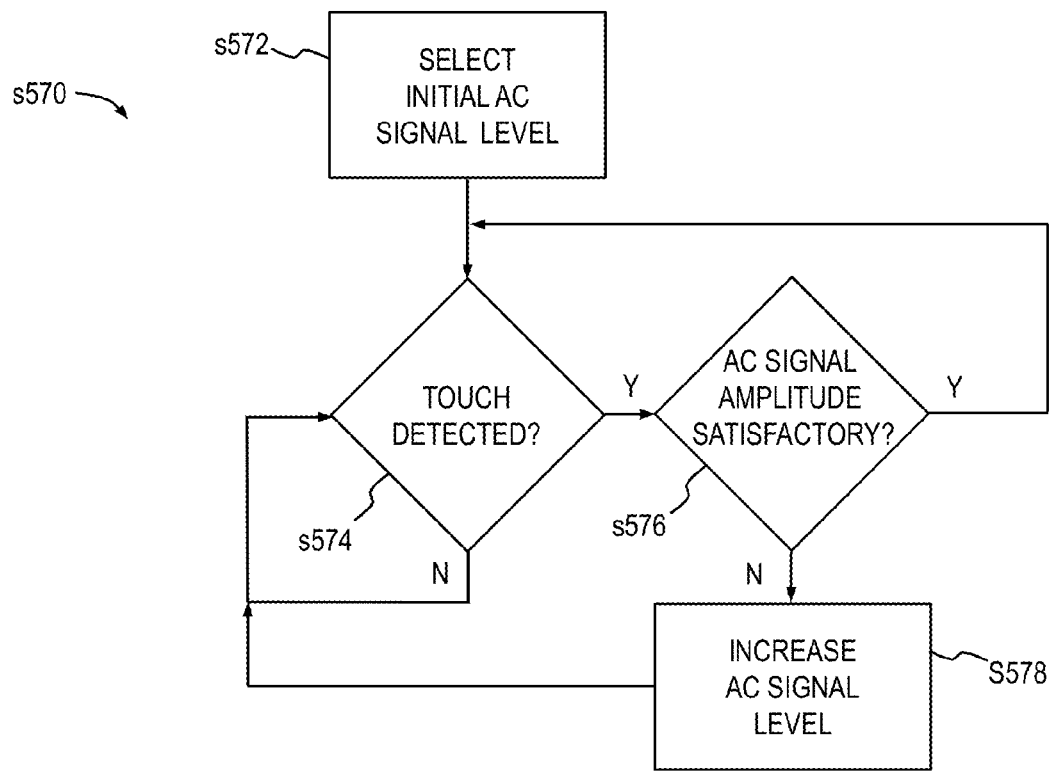
FIG. 7 is a flow diagram of another function incorporated with the touch screen system according to an embodiment of the present invention.

With reference to FIG. 7, in one embodiment of the present invention the aforementioned instructions include a function s570 to control the amplitude of the aforementioned AC signal to reliably ensure detection of actuation of a touch switch 508. At s572 an initial amplitude of the AC signal level is selected by controller 510, and touch switches 508 are monitored at s574 for an actuation. When an actuation is detected, the amplitude of the resulting actuation signal is checked at s576 to determine if the amplitude of the signal is sufficient for accurate detection. If the amplitude of the AC signal is insufficient, the amplitude is increased at s578.

The function of s570 may be repeated at each actuation of a touch switch 508 as shown in FIG. 7, or may be repeated periodically.

The function of s570 may include a noise filtering step to filter out unwanted system noise and possible false actuation of touch switches 508. The noise filtering step may be one or more separate filtering steps in function s570. Alternatively, the noise filtering step (or steps) may be integral with one or more of the aforementioned steps of function s570.

A particular advantage of the function of s570 is the ability to automatically adjust the sensitivity of touch screen system 500 to respond to either a bare finger or a hand with even very thick gloves.

Figure 8:
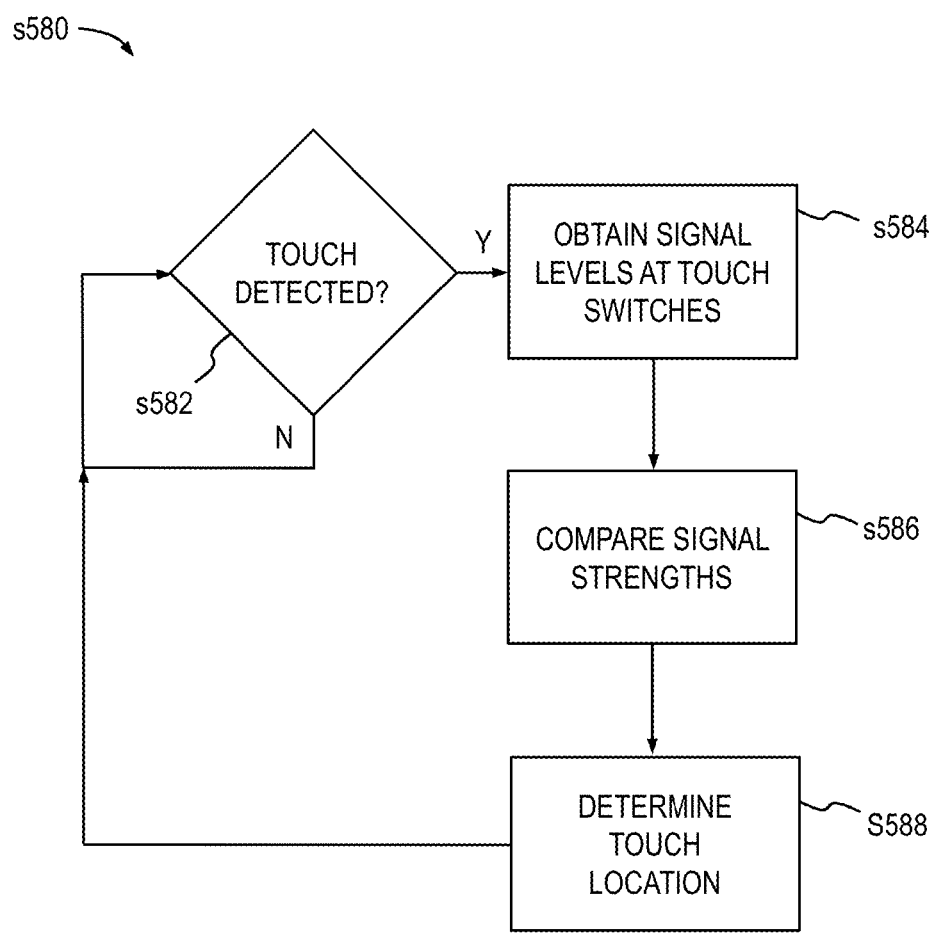
FIG. 8 is a flow diagram of yet another function incorporated with the touch screen system according to an embodiment of the present invention.

With reference now to FIG. 8, in another embodiment of the present invention the aforementioned instructions include a function s580 to alter the resolution of touch screen system 500, for example to increase the resolution to more accurately detect which touch switch has been actuated. At s582 each of touch switches 508 are monitored for actuation. When an actuation is detected, the signal levels at each of touch switches 508 are measured at s584 and compared at s586. The signal strength from all adjacent surrounding touch switches 508 near the detected touch switch are compared at s588 to generate a "map" of the active area of touch (i.e., when a plurality of touch switches are actuated). By monitoring and comparing the signal levels of the touch switches 508 in this manner the resolution of characteristics of the actuation of the touch switches (i.e., gesturing, multi-touch, etc.) is increased as compared to monitoring a single touch switch.

Costs associated with producing touch screen system 500 may be reduced in part by the relatively fewer layers (i.e., substrate 502, pads 504 and cover 506) utilized to produce touch switches 508. In addition, some or all of controller 510 may be disposed upon substrate 502, thereby reducing the number of electrical connection wires extending from touch screen system 500, thereby simplifying the overall design of the system.

The aforementioned instructions in memory 514 may include algorithms directed to tailoring the functional characteristics of touch screen system 500. For example, the instructions may include features to effectively change the size of a touch switch by clustering together a plurality of touch switches 508. Similarly, graphical user interfaces such as "sliding" controls, rotating knobs or wheels, and keyboards may be created. Touch screen system 500 may be utilized in conjunction with finger, pen, gesturing and all forms of multi-touch inputs. Furthermore, touch screen systems 500 having a plurality of sense regions with differing materials suited for transparent screens may be placed in front of monitors or placards.

A touch screen system 600 is shown in FIGS. 9, 10 and 11 according to yet another embodiment of the present invention. Touch screen system 600 includes an electrically non-conductive substrate 602 made from a suitable material, such as PET.

At least one electrically conductive pad 604 is disposed upon a select surface 606 of substrate 602. With reference to FIGS. 10 and 11, pad 604 may comprise a continuous matrix of grooves or channels 608. As an alternative to a continuous matrix, channels 608 may be joined together by an electrical connector, such as a trace.

A suitable graphene material 610, such as nanostrings, nanotubes or nanoneedles are deposited into channels 608. The composition of graphene material 610 may be varied as needed to achieve a desired electrical conductivity.

After graphene material 610 has been deposited into channels 608 an electrically non-conductive cover 612, such as glass, is placed over surface 606 of substrate 602, closing off the channels and thereby retaining the graphene material in the channels.

Pad 604 is electrically connected to a controller 614 by a trace 616 in a manner similar to pad 504, detailed above, and functions similarly to pad 504.

Touch screen system 600 is otherwise similar to system 500 and thus will not be detailed further.

A particular advantage of touch pads made with electrically conductive materials other than ITO in accordance with the various embodiments of the present invention is that many non-ITO electrically conductive materials, such as graphene and non particles, provide the requisite electrical conductivity but with better transmissivity (with respect to visual transparency). Added to the mix of either using graphene or non-ITO electrically conductive materials (such as Nano particles) to achieve conductive sense regions for capacitive coupling it becomes apparent that further savings and a process that is more friendly to the environment is achieved.

Touch screen systems commonly found in mobile devices are typically projective capacitor touch screens. These systems are popular due to their ability to handle gesturing and multi-touch. However, projective capacitor touch screens are relatively expensive and laborious to manufacture. This is due in part to the fact that many projective capacitor touch screens utilize a stack-up of 5 to 7 layers of materials. In comparison, touch screen systems 500, 600 achieve both gesturing and multi-touch with fewer layers of material, thereby reducing the cost and labor required to produce them. The additional ability to sense a glove touch also makes these systems more attractive for use in hash environments.

Figure 12:
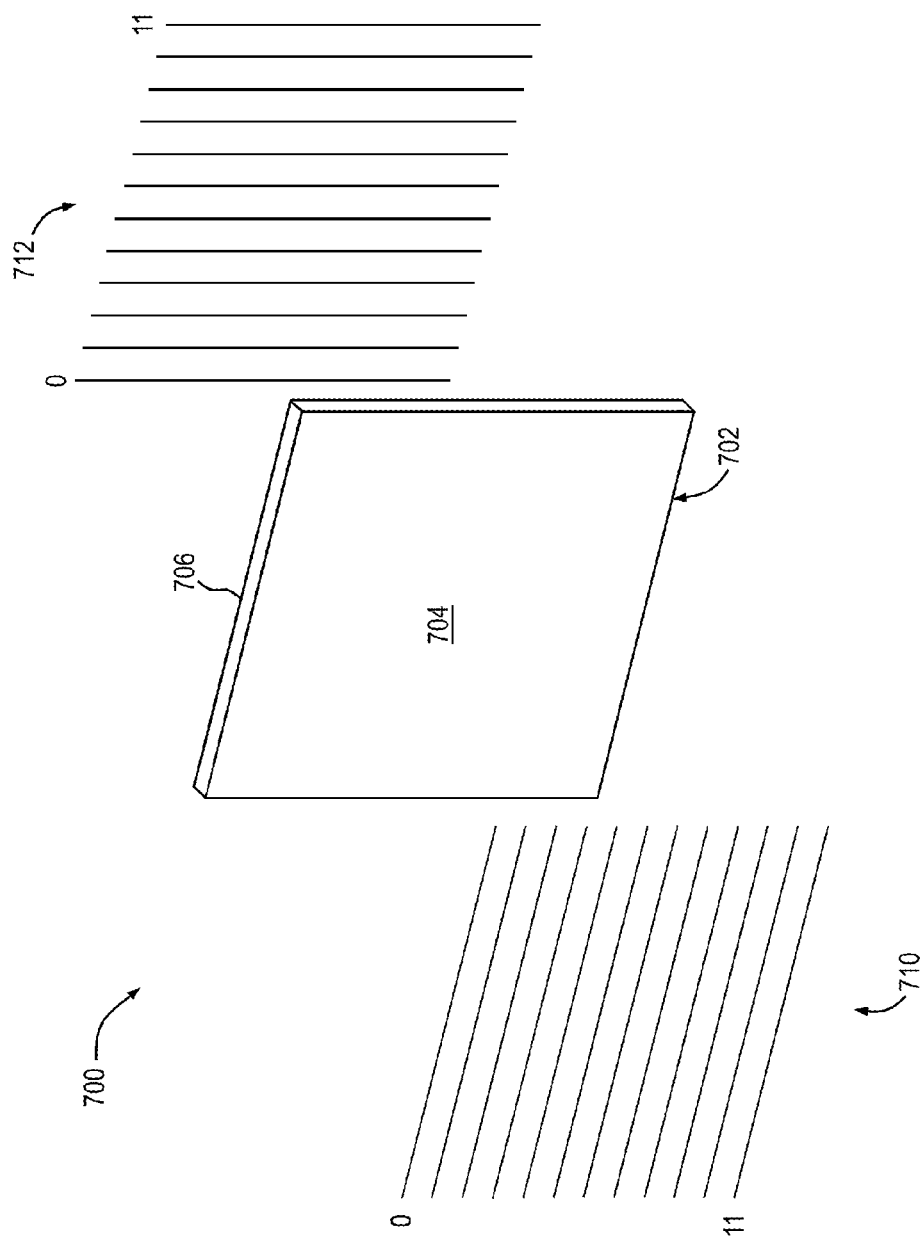
FIG. 12 is an exploded view showing the general arrangement of an example projected capacitance touch screen system according to an embodiment of the present invention.
Figures 13A, 13B:
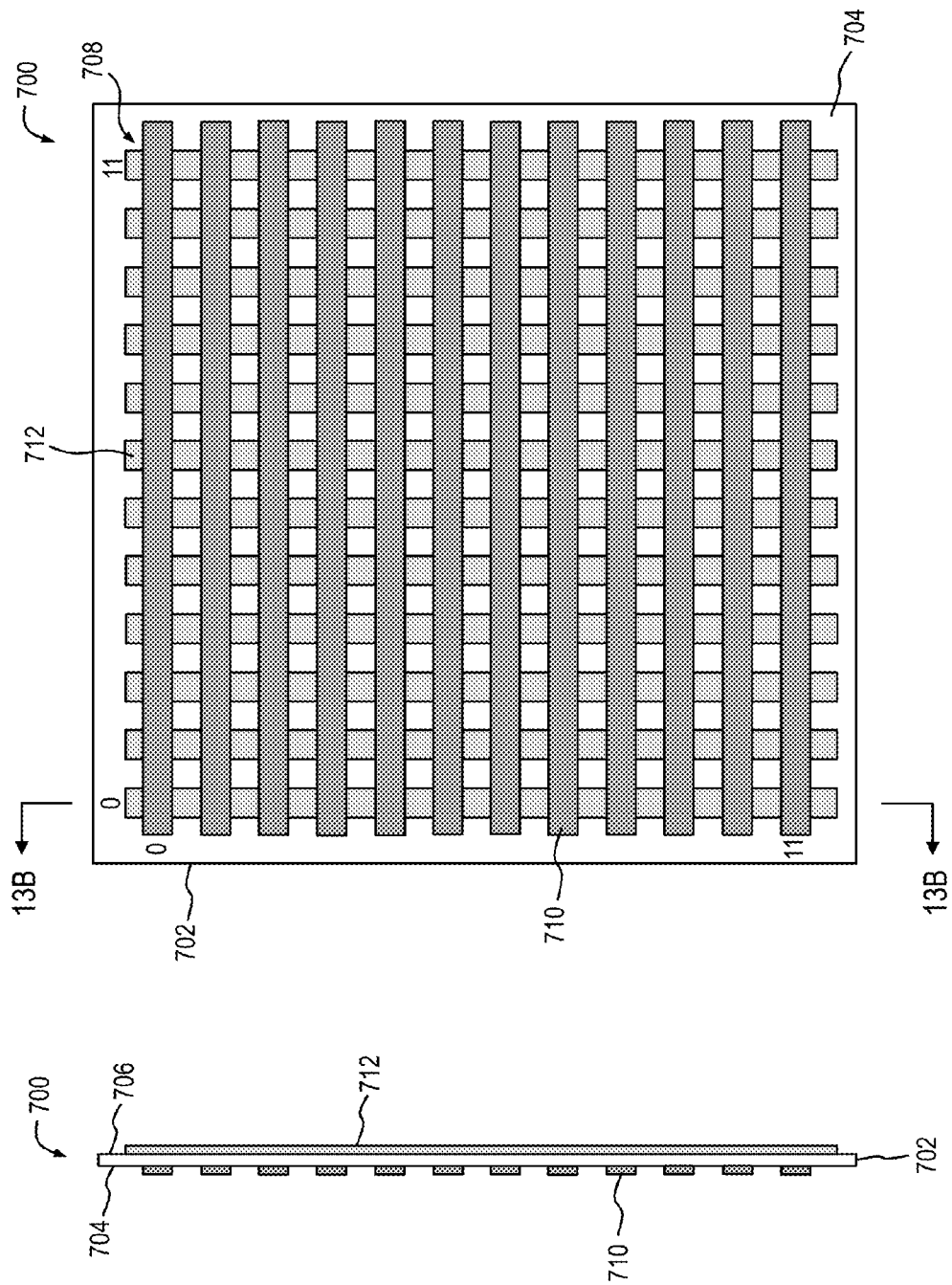
FIG. 13A is a plan view of the projected capacitance touch screen system of FIG. 12.
FIG. 13B is a view in section of the projected capacitance touch screen system of FIG. 12.

An example embodiment of the projected capacitance (PCAP) touch screen system, discussed above, is shown in FIGS. 12, 13A and 13B. In this example a touch screen system 700 comprises a substrate 702 having a first side 704 and a second, opposing side 706. An X-Y grid 708 is formed on substrate 702, a first electrically conductive layer 710 of the grid being disposed on first side 704 and comprising a plurality of "Y" rows numbered 0 through 11 in the figures for the purpose of explanation. A second electrically conductive layer 712 of grid 708 is disposed on second side 706 of substrate 702, generally orthogonally to first layer 710, and forms a plurality of "X" columns likewise numbered 0 through 11 in the figures for the purpose of explanation. A greater or lesser number of rows and columns may be provided.

In this configuration a single substrate 702 is provided having electrically conductive grids (e.g., "Y" rows 710 and "X" columns 712) disposed on opposing sides of the substrate, on opposing sides 704, 706. The intersections of rows 710 and columns 712 of grid 708 (e.g., X=2, Y=3) form projected-capacitance X-Y coordinates for touch screen 700.

While this invention has been shown and described with respect to a detailed embodiment thereof, it will be understood by those skilled in the art that changes in form and detail thereof may be made without departing from the scope of the claims of the invention.

What is claimed is:

1. A touch screen system, comprising:
a single electrically non-conductive substrate having a first side and a second, opposing side;
at least one electrically conductive pad disposed upon each of the first and second sides of the substrate and oriented generally orthogonally with respect to one another; and a controller having a touch switch interface and at least one output, the touch switch interface being electrically coupled to the pads, the controller generating an AC signal, the AC signal being electrically coupled from the controller to the pads through the touch switch interface, thereby generating an electrostatic field proximate the pads, the controller being configured to detect at the touch switch interface a change in the electrostatic field resulting from an actuating member placed in proximity to at least one of the pads, and the controller further including a memory configured to store a predetermined set of instructions, the set of instructions including a function to increase the signal-to-noise ratio of the touch screen system, the function being configured to measure the signal-to-noise ratio of a predetermined spectrum for the AC signal, select a frequency within the spectrum having a high signal-to-noise ratio, and set the frequency of the AC signal to the select frequency, the controller providing at the output a signal relating to the change in the electrostatic field.

2. The touch screen system of claim 1 wherein the substrate is made from polyethylene terephthalate.

3. The touch screen system of claim 1 wherein the pads are made from at least one of indium tin oxide, graphene, gold, silver, carbon, electrically-conductive inks, conductive oxides and nano-metal particles.

4. The touch screen system of claim 3 wherein the pads are generally transparent.

5. The touch screen system of claim 1, further including an electrically non-conductive cover over at least a portion of the pads.

6. The touch screen system of claim 1, further comprising a plurality of electrically conductive pads disposed upon each of the first and second sides of the substrate, the pads being arranged in predetermined rows and columns and oriented generally orthogonally with respect to one another.

7. The touch screen system of claim 1 wherein the signal provided at the output of the controller relates to a set of X-Y coordinate points.

8. The touch screen system of claim 1 wherein the pads include at least one of a square, rectangular, round, triangular, wedge-shaped, or a polygonal shape.

9. The touch screen system of claim 1 wherein the controller further includes at least one of a computer, microcontroller or microprocessor configured to execute the instructions.

10. The touch screen system of claim 1 wherein the instructions include a function to control the amplitude of the AC signal, the function being configured to:
monitor for a touch-actuation;
when a touch-actuation is detected, check that the amplitude of the AC signal is sufficient for accurate touch detection; and
if the amplitude of the AC signal is not sufficient for accurate touch detection, increase the amplitude of the AC signal.

11. The touch screen system of claim 1 wherein the pads form a plurality of touch switches and the instructions include a function to alter the resolution of the touch screen system, the function being configured to:
monitor for actuation of at least one touch switch;
when a touch switch actuation is detected, measure and compare the signal levels of each of the plurality of touch switches; and generate a map relating to an active area comprising actuated touch switches to determine the location of the touch actuation.

12. The touch screen system of claim 1 wherein the pads comprise:
a continuous matrix of channels disposed in the substrate; and
a predetermined quantity of graphene material disposed in the channels.

13. The touch screen system of claim 1 wherein the pads comprise:
a plurality of channels disposed in the substrate;
a predetermined quantity of graphene material disposed in the channels; and
at least one trace electrically connecting together the graphene in the channels.

14. A touch screen system, comprising:
a single electrically non-conductive substrate made from polyethylene terephthalate, the substrate having a first side and a second, opposing side;
at least one electrically conductive, generally transparent pad disposed upon each of the first and second sides of the substrate and oriented generally orthogonally with respect to one another;
an electrically non-conductive cover placed over at least a portion of the pads; and
a controller having a touch switch interface and at least one output, the touch switch interface being electrically coupled to the pads,
the controller generating an AC signal, the AC signal being electrically coupled from the controller to the pads through the touch switch interface, thereby generating an electrostatic field proximate the pads,
the controller being configured to detect at the touch switch interface a change in the electrostatic field resulting from an actuating member placed in proximity to at least one of the pads, and
the controller further including a memory configured to store a predetermined set of instructions, the set of instructions including a function to increase the signal-to-noise ratio of the touch screen system, the function being configured to measure the signal-to-noise ratio of a predetermined spectrum for the AC signal, select a frequency within the spectrum having a high signal-to-noise ratio, and set the frequency of the AC signal to the select frequency,
the controller providing at the output a signal relating to the change in the electrostatic field.

15. The touch screen system of claim 14, further comprising a plurality of electrically conductive pads disposed upon each of the first and second sides of the substrate, the pads being arranged in predetermined rows and columns and oriented generally orthogonally with respect to one another.

16. The touch screen system of claim 14 wherein the signal provided at the output of the controller relates to a set of X-Y coordinate points.

17. The touch screen system of claim 14 wherein the pads include at least one of a square, rectangular, round, triangular, wedge-shaped, or a polygonal shape.

18. A method for providing a touch screen system, comprising the steps of:
selecting a single electrically non-conductive substrate having a first and a second, opposing side;
disposing at least one electrically conductive pad upon each of the first and second sides of the substrate and orienting the pads generally orthogonally with respect to one another; and providing a controller having a touch switch interface and at least one output, the touch switch interface being electrically coupled to the pads, the controller generating an AC signal, the AC signal being electrically coupled from the controller to the pads through the touch switch interface, thereby generating an electrostatic field proximate the pads, the controller being configured to detect at the touch switch interface a change in the electrostatic field resulting from an actuating member placed in proximity to at least one of the pads, and the controller further including a memory configured to store a predetermined set of instructions, the set of instructions including a function to increase the signal-to-noise ratio of the touch screen system, the function being configured to measure the signal-to-noise ratio of a predetermined spectrum for the AC signal, select a frequency within the spectrum having a high signal-to-noise ratio, and set the frequency of the AC signal to the select frequency, the controller providing at the output a signal relating to the change in the electrostatic field.

* * * * *